Nov. 21, 1950  J. J. GRENAT  2,531,334
ALIGNED BEARING ASSEMBLY
Filed Oct. 31, 1949

INVENTOR.
John J. Grenat
BY Otto A. Earl
Attorney.

Patented Nov. 21, 1950

2,531,334

UNITED STATES PATENT OFFICE 2,531,334

ALIGNED BEARING ASSEMBLY

John J. Grenat, Detroit, Mich.

Application October 31, 1949, Serial No. 124,611

5 Claims. (Cl. 308—15)

This invention relates to improvements in aligned bearing assemblies.

The main objects of this invention are:

First, to provide a self aligning sleeve bearing or bushing assembly which permits very rapid installation with the axially spaced bearing sleeves or bushings for a shaft in perfect alignment.

Second, to provide a method for aligning bearings which avoids the necessity of reaming when new bearing sleeves or bushings are installed.

Third, to provide a structure which avoids the necessity for assembling and disassembling a machine, such for example as a motor, when it is being provided with new bushings or bearing sleeves, such assembling and disassembling being usually required where the commonly practiced methods are followed.

Fourth, to provide a method of aligning shaft bearings which may be practiced by relatively unskilled workmen.

Objects relating to details and economies of the invention will appear from the description to follow. The invention is defined and pointed out in the claims.

A preferred embodiment of the invention is illustrated in the accompanying drawing, in which.

Figure 1:
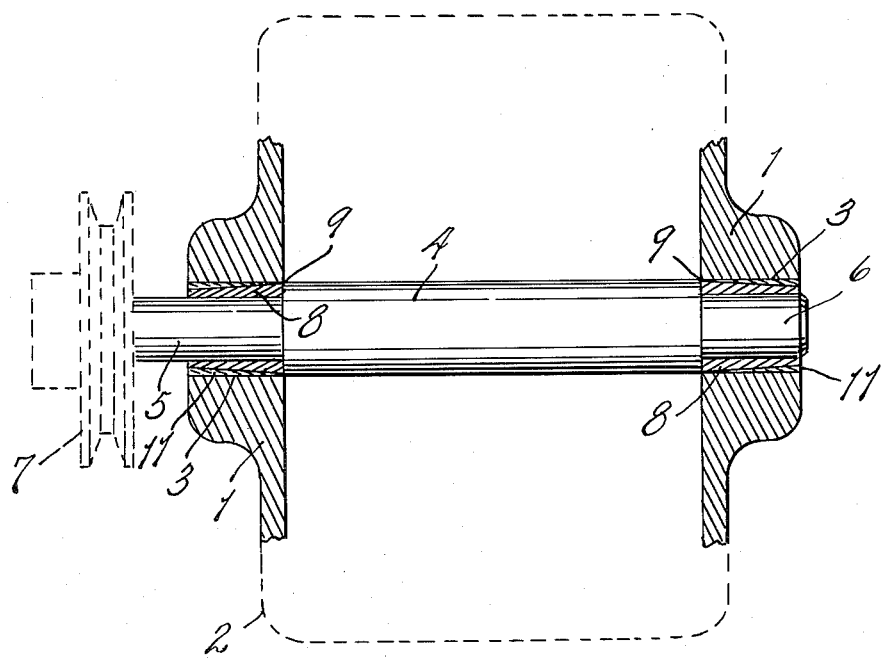
Fig. 1 is a fragmentary plan view of parts of a bearing assembly embodying my invention, the bearing pedestals or supports and the bearing sleeves or bushings being shown in horizontal sections and the shaft being shown as provided with a pulley shown by dotted lines.
Figure 2:
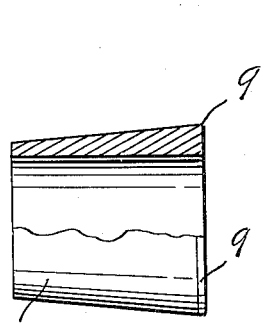
Fig. 2 is a fragmentary view partially in longitudinal section of one of the bearing sleeves or bushings.
Figure 3:
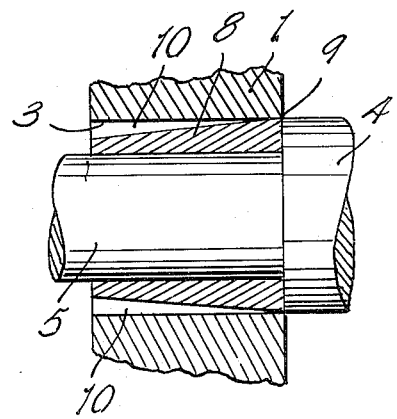
Fig. 3 is an enlarged fragmentary view partially in section illustrating one of the steps of assembling and aligning the bearings.

In the accompanying drawing, I represents the bearing pedestals or bearing supports of a motor or the like, the base of which is indicated by dotted lines 2. The supports I are provided with cylindrical bearing openings 3. The shaft 4 is provided with journals 5 and 6, the journal 5 being extended to receive the pulley 7. Each journal is provided with a bearing sleeve or bushing 8 having a portion 9 at one end thereof, desirably the inner end, adapted to tiltingly and supportingly fit in the bearing opening.

The bearing sleeves 8 are externally tapered from the wall engaging portion 9 thereof, preferably uniformly tapered, and the taper extending to the end. In assembling the sleeves or bushings 8 are assembled on the journals of the shaft and within the bearing openings 3. As the bearing sleeves are tiltingly supported at 9 they automatically assume an aligned position, after which the annular space 10 between the wall of the bearing opening or bore and the sleeve is filled with a nonshrinking quick setting material 11, such for example as Babbitt metal, which can be poured or compressed into the space in supporting and retaining engagement with the sleeves, thereby facilitating fixedly supporting the sleeves in their aligned positions.

In the event of renewal of the sleeve being required, the sleeves can be withdrawn and new sleeves inserted. This work can be done by a comparatively unskilled workman.

The applicant is aware that patents have been issued on so-called self-aligning bearings but he is not aware of any structure or methods such as is the subject matter of this invention. The applicant's method and assembly avoids the necessity of reaming and like machine or tool operations and the necessity for equipment of various sized reaming tools. The sleeves or bushings of applicant's assembly have full bearing engagement with the shaft inasmuch as they are by my method self-aligning when installed.

I have illustrated and described my invention as applied to a simple assembly of bearing or supporting pedestals and shaft but it should be understood that my invention is not confined to any particular field but may be used to advantage to various equipments and machines where bearing sleeves or bushings are employed.

Having thus described my invention, what I claim as new and desire to secure by Letters Patent is:

1. The combination with bearing supports having aligned cylindrical bearing openings therein, a shaft provided with journals, and bearing sleeves rotatably receiving and supporting said journals, said sleeves having axially restricted portions thereof at one end in initially tiltingly supported engagement with the bearing openings and being externally tapered from such restricted portions, the annular spaces between the tapered portions of the sleeves and the walls of the bearing openings being filled with material fixedly supporting the sleeves in aligned position.

2. The combination with bearing supports having aligned cylindrical bearing openings therein, a shaft, and externally tapered bearing sleeves rotatably receiving and supporting said shaft, said sleeves at one end thereof being in peripheral supporting initially tilting engagement with the bearing openings, the annular spaces between the sleeves and the walls of the bearing openings being filled with material fixedly supporting the sleeves in aligned position.

3. The combination with bearing supports having aligned bearing openings therein, a shaft, and bearing sleeves rotatably receiving and supporting said shaft, said sleeves having axially restricted portions thereof at one end in initially tiltingly supported engagement with the bearing openings and being of reduced section from such wall engaging portions facilitating the aligning thereof, the spaces between the reduced section portions of the sleeves and the walls of the bearing openings being filled with non-yieldable material fixedly supporting the sleeves in their aligned positions.

4. The combination with bearing supports having aligned bearing openings therein, a shaft, and externally bearing sleeves rotatably receiving and supporting said shaft, said sleeves at one end thereof being initially in peripheral supporting tilting engagement with the bearing openings facilitating the aligning of the sleeves, the annular spaces between the sleeves and the walls of the bearing openings being filled with material fixedly supporting the sleeves in their aligned position.

5. The combination with a support having a cylindrical bearing opening therein, a shaft, and a bushing rotatably receiving and supporting said shaft, said bushing having a portion at one end thereof in initially supporting tilting engagement with the bearing opening facilitating the aligning thereof and being externally tapered from such portion, the annular space between the bushing and the wall of the bearing opening being filled with non-shrinking material fixedly supporting the bushing in its tiltingly adjusted position.

JOHN J. GRENAT.

REFERENCES CITED

The following references are of record in the file of this patent:

UNITED STATES PATENTS

| Number | Name | Date |
|---|---|---|
| 1,515,266 | Mitchell | Nov. 11, 1924 |
| 1,900,617 | Ricardo | Mar. 7, 1933 |
| 2,252,351 | Paulus | Aug. 12, 1941 |
| 2,366,668 | Heim | Jan. 2, 1945 |